No. 642,737. Patented Feb. 6, 1900.
E. BONNET, J. PAUFIQUE & G. LINIÈRE.
ELECTRIC RAILWAY.
(Application filed July 11, 1899.)
(No Model.)
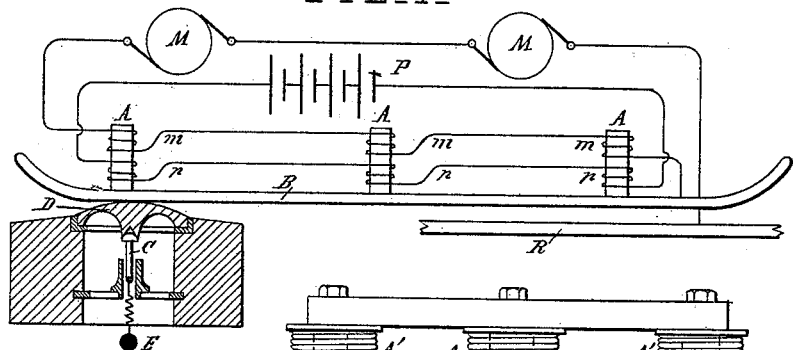
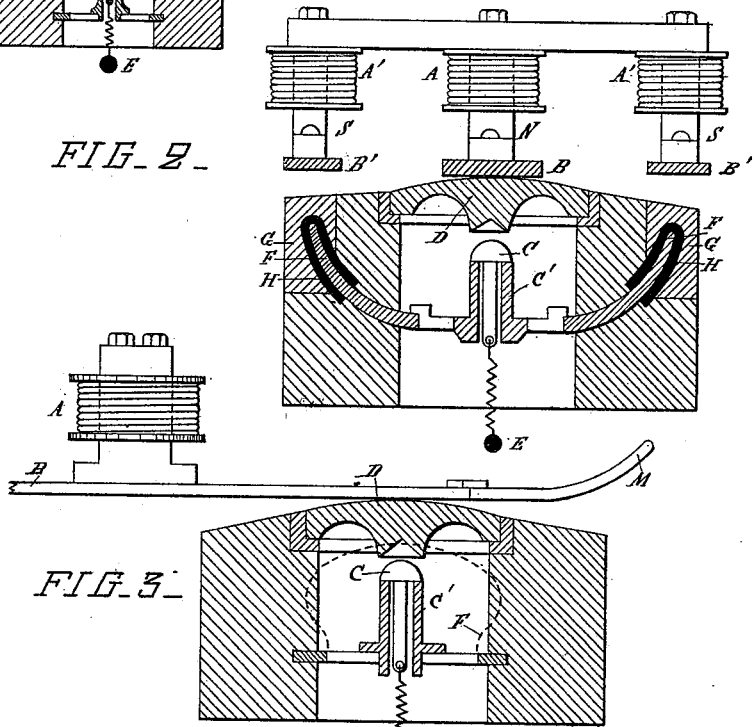
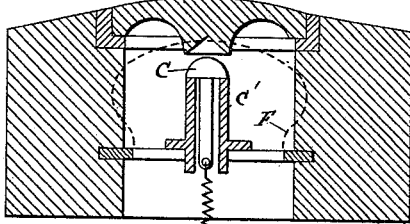
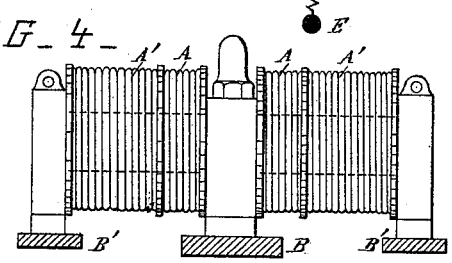
WITNESSES:
INVENTORS
Edouard Bonnet
Jules Paufique
Georges Linière
BY
Richardson
ATTORNEYS
THE NORRIS PETERS CO., PHOTO-LITHO., WASHINGTON, D. C.

UNITED STATES PATENT OFFICE.

EDOUARD BONNET, JULES PAUFIQUE, AND GEORGES LINIÈRE, OF LYONS, FRANCE.

ELECTRIC RAILWAY.

SPECIFICATION forming part of Letters Patent No. 642,737, dated February 6, 1900.

Application filed July 11, 1899. Serial No. 723,487. (No model.)

*To all whom it may concern:*

Be it known that we, EDOUARD BONNET, JULES PAUFIQUE, and GEORGES LINIÈRE, citizens of France, residing at Lyons, France, have invented certain new and useful Improvements in Electric Tramways, of which the following is a full, clear, and exact description.

We will describe our invention by the aid of the accompanying drawings, in which—

Figure 1 shows a vertical section of one of the main-line contact-boxes, one of the tram or railway lines, a straight magnet or contact, bar carried by a vehicle, and a diagram of a compound winding of the straight magnet, showing the connections with a special battery and with the motors. Fig. 2 is a vertical transverse section of a contact-box, a straight magnet or contact-bar, and lateral bars connected with the upper armature of the said straight magnet. Fig. 3 is a sectional view drawn at right angles to Fig. 2, and Fig. 4 is a sectional elevation showing a modification of the straight magnet or contact-bar.

Our improvements are applicable to electric tramways or railways in which the current is transmitted by means of a straight magnet coming successively into contact with metallic covered boxes flush with the ground and causing, by their magnetic action, the passage of the current to the said boxes. In tramways or railways of this system when the straight magnet comes into contact with the cover of one of these boxes it attracts a contact suspended in said box and connected by a flexible connection to the main electric conductor. The current thus enters the carriage through the straight magnet, actuates the motor, and returns through the rails. The magnetization of the straight magnet is effected by a special source of electricity, a primary or secondary battery carried by the carriage.

Our improvements have for their object to reduce to the minimum the importance of this source by joining to it at the desired moment the excitation of the motor-current and by better utilizing, on the other hand, the magnetic field thus created. The first of these conditions is realized by means of a compound winding arranged as indicated in diagram Fig. 1.

The electromagnets A, which maintain the magnetization of the straight magnet B, are excited in a continuous manner by the battery P by means of a primary winding $p$ $p$, sufficient only to obtain the attraction of the pin C, working within a guiding socket $c'$, and to maintain it in its contact position, a strong pressure of this pin against the plug D of insulating material not being necessary so long as the current taken by the carriage is nothing. The same electromagnets A receive a second winding $m$ $m$ in series with the circuit of the motors coming from the principal line E, passing through the pin C, the straight magnet B, the motors M, and returning to the rails R. The main current is established in this circuit as soon as the pin C is in contact, and its action is then added to that of the battery to increase the contact-pressure in proportion as the current borrowed from the line is greater. These arrangements would also be applicable if the electromagnets excited by means of a special constant current were replaced by permanent magnets. The power of these latter would then be reduced to that sufficient to establish simply the contact of the pin C. The motor-current coming as previously described increases, at the useful moment the pressure of this contact.

The contact-pin C is carried by a cast-iron ring provided with wings F, (see Figs. 2 and 3,) embedded in the masonry of the box, and, rising toward the surface of the ground, it is by these wings that the return is established of the magnetic field to the poles S of the electromagnets opposed to the poles N in contact with the straight magnet. This return across a mass of air of considerable resistance is very defective from the magnetic point of view. We have remedied this by bringing the poles S of the electromagnets near the wings F by means of the arrangement shown at Figs. 2 and 3.

The straight magnet B, Fig. 2, is placed between two lateral bars B' B' in communication with the upper armature of the electromagnet, and consequently forming two poles of contrary name to that of the principal or straight magnet. The winding of the wire of the electromagnet thus arranged can take place on vertical pieces, as in Fig. 2, or on horizontal pieces, as shown at Fig. 4, or in any other manner provided that the principal or straight magnet forms a pole of contrary name to those of the lateral bars B' B'. The bars B' pass at a little distance from the wings F, which in itself considerably reduces the resistance to the return of the magnetic field; but this resistance can be further diminished by rendering magnetic the parts G of the box within which the wings F rise and which are opposite the bars B'. This result is obtained by forming these parts of an agglomeration containing debris of magnetic bodies, from which the wings F are electrically insulated by covering them with a layer H of enamel, asbestos, or other insulating-body.

To the arrangements represented at Figs. 2 and 4 can readily be added the compound winding, the principle of which is indicated at Fig. 1.

In the arrangement shown at Fig. 2 the coil A would receive the winding fed from the special source and the coils A' would be traversed by the motor-current.

In the arrangement shown at Fig. 4 each coil would be divided into two—those A A traversed by the current from the special source and those A' A' traversed by the motor-current. It may also happen that the surface of the ground being rendered conductive by any given cause—such as water, salted snow, &c.—a current is established between the rails and the plug D at the moment when this latter comes into contact with the pin C. This current being interrupted at the falling of the pin C, there might result from it a cause of rapid deterioration of the pin. We avoid this inconvenience by applying to the two ends of the straight magnet B (see Fig. 3) an element M of conducting but non-magnetic metal, such as copper, bronze, &c. Under these conditions when the magnetized part of the straight magnet has left the plug D the pin C falls, but without interrupting the superficial current, which, borrowed from the following box, is prolonged during the contact of the additional element M with the plug.

Having fully described our invention, what we claim, and desire to secure by Letter Patent, is—

1. In a closed-conduit system for electric railways, a car having a magnetized bar, and an energizing-coil for imparting additional magnetism to said bar, said coil being in series with the motor and receiving the full current passing to the motor, substantially as described.

2. In an electric tramway or railway the combination with the motor-conductors, of a straight magnet making contact with current-transmitting boxes flush with the surface of the ground and conducting but non-magnetic parts connected to the ends of the straight magnet, substantially as herein set forth and for the purpose stated.

3. In an electric tramway or railway the combination of main line or conductor movable contact-pin connected to such main conductor, a cast-iron ring provided with a guiding-socket to carry such pin, wings attached to said ring and rising to near the surface of the ground, a non-conducting box carrying said ring and contact-pin and having the said wings embedded therein, a conducting-plug closing the upper end of the box and a straight magnet carried by the vehicle and connected with the motor-conductors substantially as herein set forth and for the purpose stated.

In testimony whereof we affix our signatures in presence of two witnesses.

EDOUARD BONNET.
    JULES PAUFIQUE.
    GEORGES LINIÈRE.

Witnesses:
 THOS. N. BROWNE,
 M. VAHONY.